(12) United States Patent
Xiong et al.

(10) Patent No.: US 11,353,887 B2
(45) Date of Patent: Jun. 7, 2022

(54) ROBOT CENTROID POSITION ADJUSTMENT METHOD AND APPARATUS AND ROBOT USING THE SAME

(71) Applicant: UBTECH ROBOTICS CORP LTD, Shenzhen (CN)

(72) Inventors: Youjun Xiong, Shenzhen (CN); Yuesong Wang, Shenzhen (CN); Mingguo Zhao, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 298 days.

(21) Appl. No.: 16/587,069

(22) Filed: Sep. 30, 2019

(65) Prior Publication Data

US 2020/0209890 A1    Jul. 2, 2020

(30) Foreign Application Priority Data

Dec. 29, 2018 (CN) ........................ CN201811630615

(51) Int. Cl.
    *G05D 1/08* (2006.01)
    *B25J 9/16* (2006.01)
    *B25J 13/08* (2006.01)

(52) U.S. Cl.
    CPC ............ *G05D 1/0891* (2013.01); *B25J 9/162* (2013.01); *B25J 9/1607* (2013.01); *B25J 9/1653* (2013.01); *B25J 13/089* (2013.01)

(58) Field of Classification Search
    None
    See application file for complete search history.

(56) References Cited

U.S. PATENT DOCUMENTS

| | | | | |
|---|---|---|---|---|
| 8,060,253 B2* | 11/2011 | Goswami | ............. | B62D 57/032 |
| | | | | 700/250 |
| 2013/0144441 A1* | 6/2013 | Kanazawa | ........... | B62D 57/032 |
| | | | | 700/263 |
| 2013/0184861 A1* | 7/2013 | Pratt | .................... | B62D 57/032 |
| | | | | 700/245 |
| 2017/0036346 A1* | 2/2017 | Kamioka | ............. | B62D 57/032 |

FOREIGN PATENT DOCUMENTS

CN        103217903 A        7/2013

* cited by examiner

*Primary Examiner* — Jeff A Burke
*Assistant Examiner* — Arslan Azhar

(57) ABSTRACT

The present disclosure provides a robot centroid position adjustment method as well as an apparatus and a robot using the same. The method includes: obtaining initial values; obtaining a waist velocity adjustment value; calculating a current value of the centroid position; and determining whether a current value of the centroid position is equal to the planning value of the centroid position; if the current value of the centroid position is not equal to the planning value of the centroid position, obtaining the current value of the centroid position to take as the initial value of the centroid position and returning to the step of obtaining the waist velocity adjustment value until the current value of the centroid position is equal to the planning value of the centroid position. In such a manner, the balance ability of the robot can be improved.

20 Claims, 12 Drawing Sheets

ROBOT CENTROID POSITION ADJUSTMENT METHOD AND APPARATUS AND ROBOT USING THE SAME

CROSS REFERENCE TO RELATED APPLICATIONS

This application claims priority to Chinese Patent Application No. 201811630615.7, filed Dec. 29, 2018, which is hereby incorporated by reference herein as if set forth in its entirety.

BACKGROUND

1. Technical Field

The present disclosure relates to robot control technology, and particularly to a robot centroid position adjustment method as well as an apparatus and a robot using the same.

2. Description of Related Art

In conventional biped robot control technology, it usually uses a three-mass model to simplify the structure of a robot when calculating the actual centroid position at which the robot is walking, that is, simplify the robot into a model with only three rigid bodies of a waist, a left leg, and a right leg. Since the simplified model and approximations are used in the process, which results in a large deviation between the actual centroid position that is calculated based on the three-mass model and the centroid position of the robot that is planned based on preset parameters. For example, for a robot of 1.5 meters in height and 50 kilograms in weight, the error of the centroid position will be about 3-5 centimeters. Due to the error, the capability of the balance control and quick motion of the robot at walking is often affected.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

Figure 1:
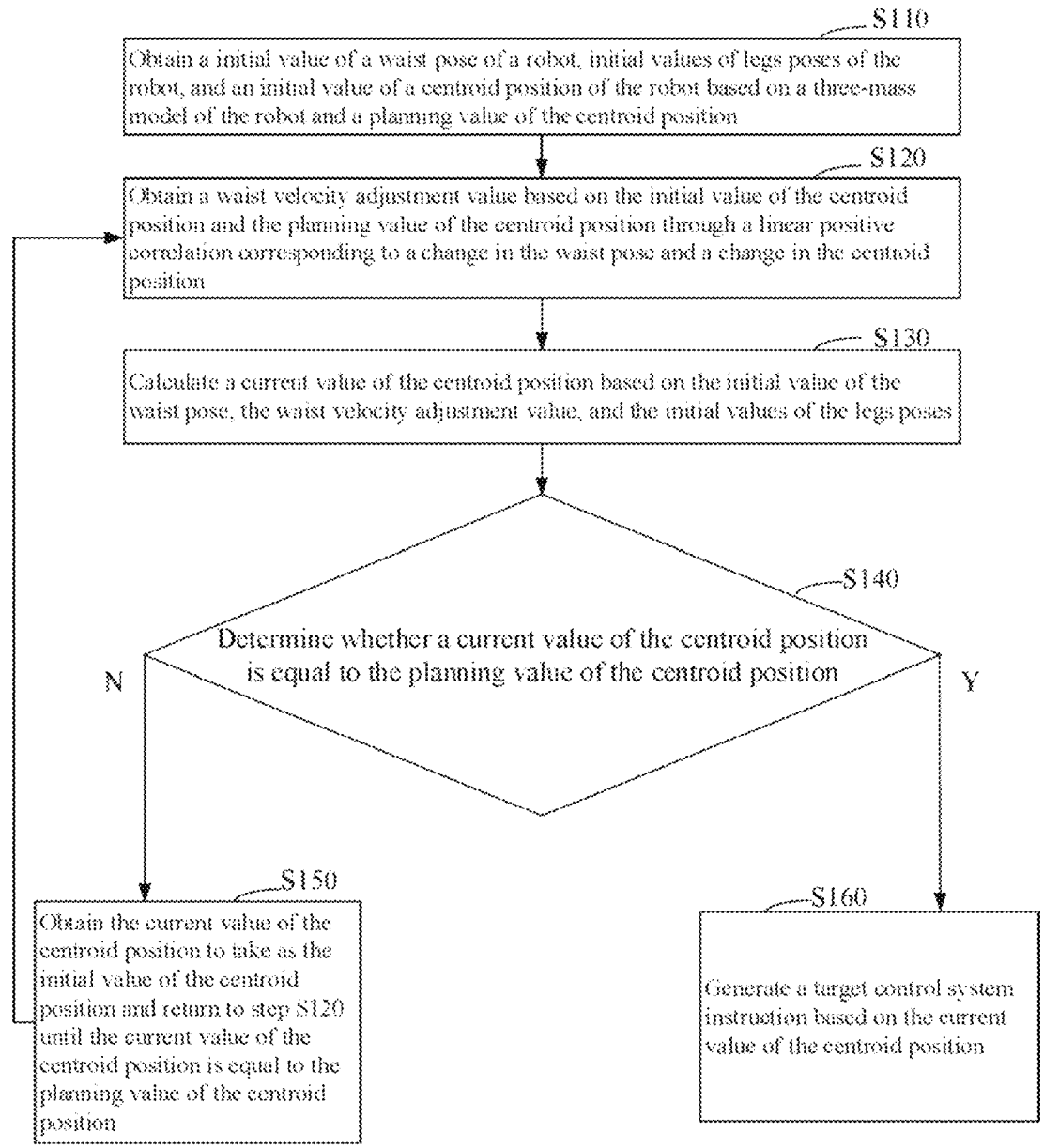
FIG. 1 is a flow chart of an embodiment of a robot centroid position adjustment method according to the present disclosure.

In the following, various embodiments of the present disclosure will be described more comprehensively. The present disclosure can have various embodiments, and adjustments and changes can be made therein. However, it should be understood that, the present disclosure will not be limited to the embodiments disclosed herein, but should be comprehended as including all adjustments, equivalents and/or alternative schemes that are within the spirit and scope of the various embodiments of the present disclosure.

In the following, the terms "including" or "can include" used in the various embodiments of the present disclosure are to indicate the existence of the disclosed function, operation or element, and does not limit the increasing of one or more functions, operations or elements. In addition, the terms "including," "having," and its cognates are merely intended to represent particular features, numbers, steps, operations, elements, components, or their combinations, and should not be understood that the existence or addition of one or more other or same features, numbers, steps, operations, elements, components, or their combinations should be excluded.

In the various embodiments of the present disclosure, the expression of "at least one of A or/and B" includes any or all combinations of simultaneously listed words. For example, the expression of "A or B" or "at least one of A or/and B" may include A, may include B, or may include both A and B.

The expressions used in the various embodiments of the present disclosure (e.g., "first" and "second") can be used to modify various elements in the various embodiments, while may not limit the corresponding elements. For example, the above-mentioned statements do not limit the order and/or importance of the elements. The forgoing expressions are only used for the purpose of distinguishing one element from another. For one example, the first user device and the second user device indicate different user devices, although both are user devices; for another example, in the case without departing from the scope of the various embodiments of the present disclosure, the first element can be referred to as the second element, contrarily, the second element can be referred to as the first element.

It should be noted that, if one element is described as "connecting" to another element, the first element can be directly connected to the second element, and can also "connecting" the third element between the first element and the second element. On the contrary, when an element is "directly connected" to another element, it can be understood that there is no third element between the first element and the second element.

The term "user" as used in the various embodiments of the present disclosure may indicate a person using a device or another device using the device (e.g., an artificial intelligence electronic device).

The terms used in the various embodiments of the present disclosure are only for the purpose of describing the specific embodiments and are not intended to limit the various embodiments of the present disclosure. As used herein, the singular forms are also intended to include the plural forms, unless the context clearly indicates otherwise. All terms (including technical and scientific terms) used herein have the same meaning as commonly understood by those ordinary skill in the art of the various embodiments of the present disclosure, unless defined otherwise. The terms (e.g., terms defined in a commonly used dictionary) will be interpreted as having the same meaning as the contextual meaning in the related art and should not be interpreted as having an idealized meaning or an overly formal meaning, unless clearly limited otherwise in the various embodiments of the present disclosure.

In order to make the objectives, technical schemes and advantages of the present disclosure more comprehensible, the present disclosure will be further described in detail below with reference to the drawings and embodiments. It should be noted that, the coordinate system in the following calculation processes adopts a world coordinate system.

FIG. 1 is a flow chart of an embodiment of a robot centroid position adjustment method according to the present disclosure. In this embodiment, a robot centroid position adjustment method for a robot such as a biped robot is provided. The method is a computer-implemented method executable for a processor, which may be implemented through and applied to a robot centroid position adjustment apparatus shown in FIG. 9 or a robot, or implemented through a computer readable storage medium. As shown in FIG. 1, the method includes the following steps.

S110: obtaining an initial value of a waist pose of the robot, initial values of legs poses of the robot, and an initial value of a centroid position of the robot based on a three-mass model of the robot and a planning value of the centroid position.

In which, the planning value of the centroid position can generally be obtained by setting the robot according to the actual needs in advance. For the general humanoid robot such as a biped robot, the three-mass model usually means a model that simplified the robot into three rigid bodies with only a waist, a left leg, and a right leg. In which, the simplifying process can use a centroid inverse kinematics calculation method can roughly calculate the initial value of the waist pose (i.e., the pose of the waist of the robot), the initial values of the legs poses (i.e., the pose of legs of the robot such as the left leg and the right leg) and the initial value of the centroid position based on the planning value of the centroid position. Because the accuracy of the calculation process is not high, subsequent calculations for adjustments are needed. The pose includes the positon and the posture, where the positon can be a coordinate in a world coordinate system, and the posture can be an Euler angle in the world coordinate system.

In which, the initial values of the legs poses is the initial value corresponding to the robot in a cycle of the target control system instruction, that is, the initial value corresponding to the robot in a single cycle of the control system instruction. For example, the cycle of the control system instruction of the robot usually has the unit of 1 ms, and the initial values of the legs poses (including the initial value of the left leg pose and the initial value of the right leg pose) of the robot remains unchanged within this 1 ms.

In which, the planning value of the centroid position, the initial value of the waist pose, the initial values of the legs poses, and the initial value of the centroid position are all represented by a world coordinate system.

S120: obtaining a waist velocity adjustment value based on the initial value of the centroid position and the planning value of the centroid position through a linear positive correlation corresponding to a change in the waist pose and a change in the centroid position.

In which, the directions of the change in the waist pose and the change in the centroid position are the same. When the legs poses of the robot are fixed, if the position of the waist of the robot is moved, the centroid of the robot will be moved in the same direction, and the changes of the two meets a positive correlation; in addition, the waist pose and the centroid position can meet a basically linear relationship (which can be approximated as a linear relationship for processing), and the waist pose and the centroid position can meet the principle of linear superposition, and then the change of the waist pose and the change of the centroid position can meet the corresponding linear positive correlation.

Figure 2:
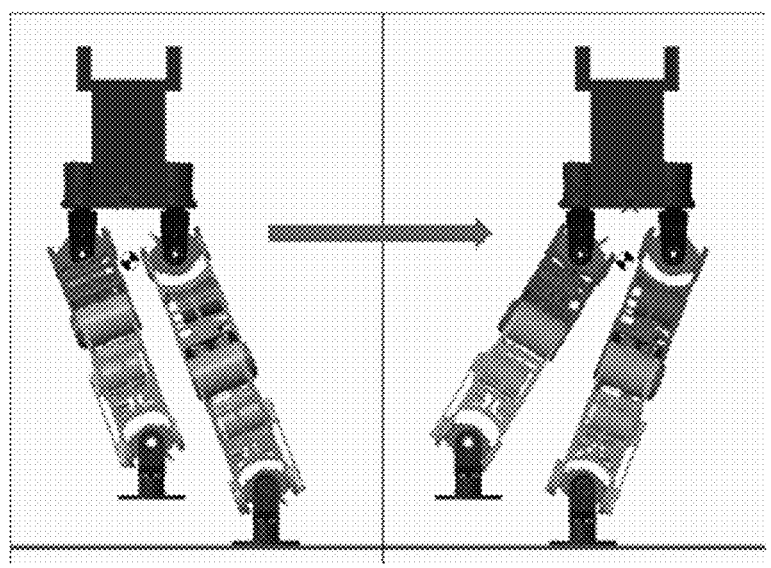
FIG. 2 is a schematic diagram of the relationship between the change of the waist pose and the change of the centroid position according to an embodiment of the present disclosure.

FIG. 2 is a schematic diagram of the relationship between the change of the waist pose and the change of the centroid position according to an embodiment of the present disclosure. As shown in FIG. 2, in this embodiment, when the legs of the robot are fixed, if the waist of the robot is moved to the right, the centroid of the robot will also be moved to the right accordingly, and this relationship is nearly linear (although it is not a typical linear relationship, because the linear correlation coefficient is high, it can be regarded as linear in mathematics). For example, if the waist is moved 6 cm to the right, and the displacement of the centroid is about 3 cm to the right, since there is a linear correlation between the positional change of the centroid and the change of the waist pose, there has characteristics suitable for linear processing in mathematics. Therefore, for the above-mentioned changes of the waist pose and the centroid position, the above-mentioned positive correlation and the mathematical characteristic suitable for linear processing can be combined to calculate and adjust the actual position of the centroid corresponding to the robot by constructing a Newton-Raphson based loop iterative operation through the centroid inverse kinematics algorithm.

In one embodiment, as indicated by the following formula:

$$V_{waist}=Kp(COM_{desired}-COM_{actual});$$

where, $V_{waist}$ is the waist velocity adjustment value, $COM_{desired}$ is the planning value of the centroid position, $COM_{actual}$ is the initial value of the centroid position, $(COM_{desired}-COM_{actual})$ is the change amount of the centroid position, and Kp is the linear adjustment coefficient.

In which, in the above-mentioned formula, the upper limit of Kp is determined by the distribution of the mass of the robot. For example, if the centroid is in the middle of the waist and the legs, the upper limit of Kp generally does not exceed 2, where the value of Kp can be adjusted according to the actual needs to meet the actual correspondence between the change of centroid position and the actual change of the waist pose, and $V_{waist}$ merely indicates the virtual waist velocity adjustment value during the calculation.

S130: calculating a current value of the centroid position based on the initial value of the waist pose, the waist velocity adjustment value, and the initial values of the legs poses.

In which, the current value of the waist pose can be calculated through mathematical integration based on the initial value of the waist pose and the waist velocity adjustment value. Furthermore, by using the inverse kinematics algorithm, the current value of the centroid position can be calculated based on the current value of the waist pose and the initial values of the legs poses.

S140: determining whether a current value of the centroid position is equal to the planning value of the centroid position; if not, step S150 is executed; otherwise, step S160 is executed.

The current value of the centroid position obtained by the above-mentioned calculation is the current value of the centroid position obtained through the calculation and adjustment, which needs to be further compared with the planning value of the centroid position. If they are not equal, the iterative calculation and adjustment needs to be continued, and the step S150 is executed; otherwise, the step S160 is executed.

S150: obtaining the current value of the centroid position to take as the initial value of the centroid position and returning to step S120 until the current value of the centroid position is equal to the planning value of the centroid position.

In which, since the planning value of the centroid position, the initial value of the waist pose, and the initial position of the legs poses are not changed during the cycle of the current control system instruction, if it returns to step S120 to continue executing, the current value of the centroid position that is obtained in the previous calculation process is taken as the initial value of the centroid position in the next calculation process to calculate perform iterative calculations, and finally the current value of the centroid position corresponding to the process is obtained, and then continue to compare with the planning value of the centroid position to determine whether they are equal. If they are equal, step S160 is executed; otherwise, it returns to step S120 to repeat the above-mentioned calculation process until the obtained current value of the centroid position is equal to the planning value of the centroid position, and then step S160 is executed.

S160: generating a target control system instruction based on the current value of the centroid position.

During the cycle of the current control system instruction, the above-mentioned calculation process may be performed for multiple times. If the calculated current value of the centroid position is equal to the corresponding planning value of the centroid position in the cycle of the current control system instruction, the robot generates the target control system instruction based on the current value of the centroid position and obtains the corresponding control parameters based on the target control system instruction, thereby adjusting the angle of each joint to realize the adjustment of the actual position of the centroid of the robot.

Figure 3:
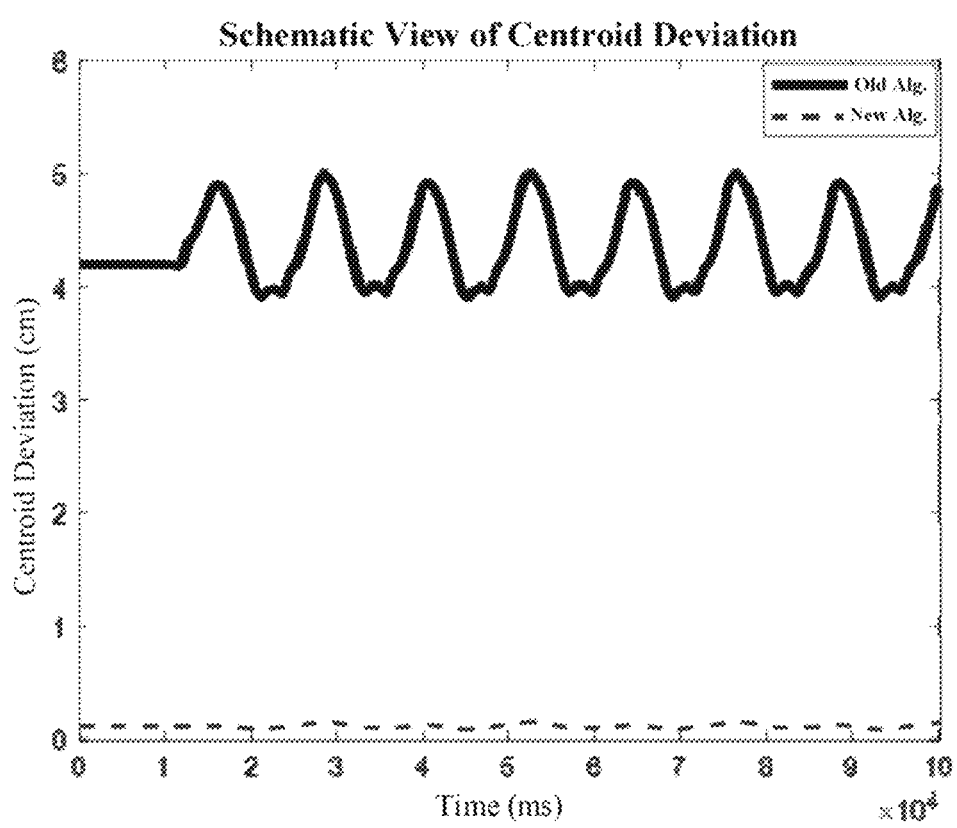
FIG. 3 is a schematic diagram of the effect of adjusting the centroid position of the robot according to an embodiment of the present disclosure.

FIG. 3 is a schematic diagram of the effect of adjusting the centroid position of the robot according to an embodiment of the present disclosure. As shown in FIG. 3, in this embodiment, the robot is a biped robot. By using the above-mentioned robot centroid position adjustment method (i.e., the new algorithm in FIG. 3), the centroid position error between the calculated current value of the centroid position of the robot and the planning value of the centroid position is reduced from centimeters to millimeters, which effectively reduces the disturbance while the robot walks, improves the walking stability of the robot, and enhances the balance control capability. In addition, the above-mentioned adjustment method has good real-time performance. Taking a 12-DOF (degrees of freedom) humanoid robot as an example, the centroid error can be reduced to less than 1 mm. Hence, only 0.3 milliseconds of computational capability is required, which is much smaller than the cycle of the control system instruction corresponding to the robot, and does not affect the real-time control system of the robot at all.

In the above-mentioned method includes: obtaining robot-related initial parameters including an initial value of a waist pose, initial values of legs poses, and an initial value of a centroid position based on a three-mass model of the robot and a planning value of the centroid position; obtaining a waist velocity adjustment value based on the initial value of the centroid position and the planning value of the centroid position through a linear positive correlation corresponding to a change in the waist pose and a change in the centroid position; calculating a current value of the centroid position based on the initial value of the waist pose, the waist velocity adjustment value, and the initial values of the legs poses; and determining whether a current value of the centroid position is equal to the planning value of the centroid position; if the current value of the centroid position is not equal to the planning value of the centroid position, obtaining the current value of the centroid position to take as the initial value of the centroid position and returning to the step of obtaining the waist velocity adjustment value until the current value of the centroid position is equal to the planning value of the centroid position; otherwise, generating a target control system instruction based on the current value of the centroid position.

The above-mentioned robot centroid position adjustment method skillfully utilizes the linear positive correlation corresponding to the change of the waist pose and the change of the centroid position under the condition that the legs poses of the robot are remained unchanged at the cycle of the current control system instruction, which uses the change of the waist pose to perform the feedback and adjustment on the centroid position. After multiple times of iterative loop calculations, the error between the planning position of the centroid of the robot and the actual position of the centroid of the robot that is calculated based on the three-mass model is greatly reduced, and effectively reduces the disturbance when the robot walks, thereby improving the walking stability of the robot and enhancing the balance control ability.

Figure 4:
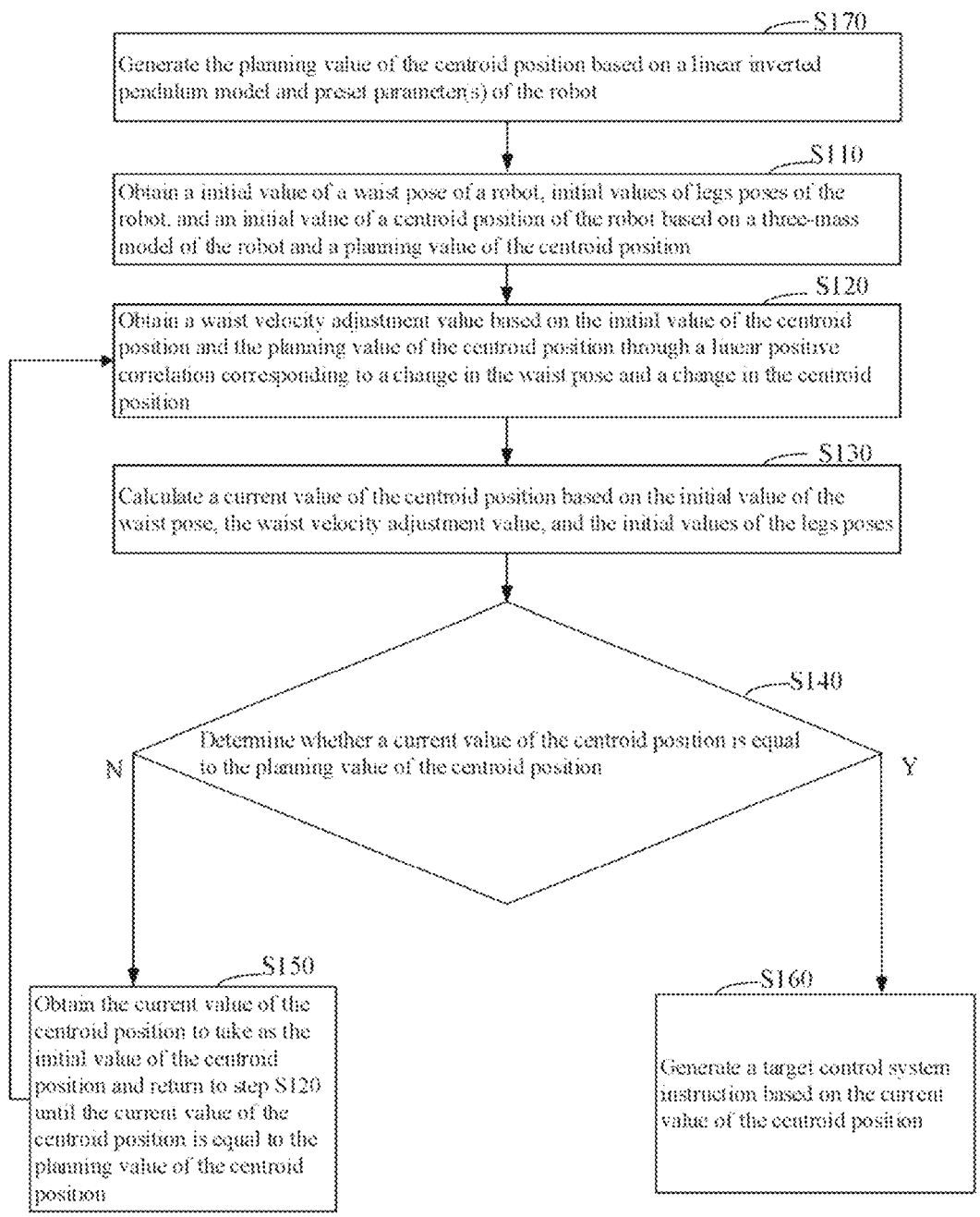
FIG. 4 is a flow chart of another embodiment of a robot centroid position adjustment method according to the present disclosure.

FIG. 4 is a flow chart of another embodiment of a robot centroid position adjustment method according to the present disclosure. As shown in FIG. 4, in this embodiment, the robot centroid position adjustment method is based on the robot centroid position adjustment method of the embodiment of FIG. 1. In addition to the steps in the robot centroid position adjustment method of the embodiment of FIG. 1, the method further includes the following steps.

S170: generating the planning value of the centroid position based on a linear inverted pendulum model and preset parameter(s) of the robot.

In which, by using the linear inverted pendulum model and combining a planning velocity and a planning step size of the robot, a time trajectory about the centroid position can be generated, and can further obtain the corresponding planning value of the centroid position in the cycle of the current control system instruction.

Figure 5:
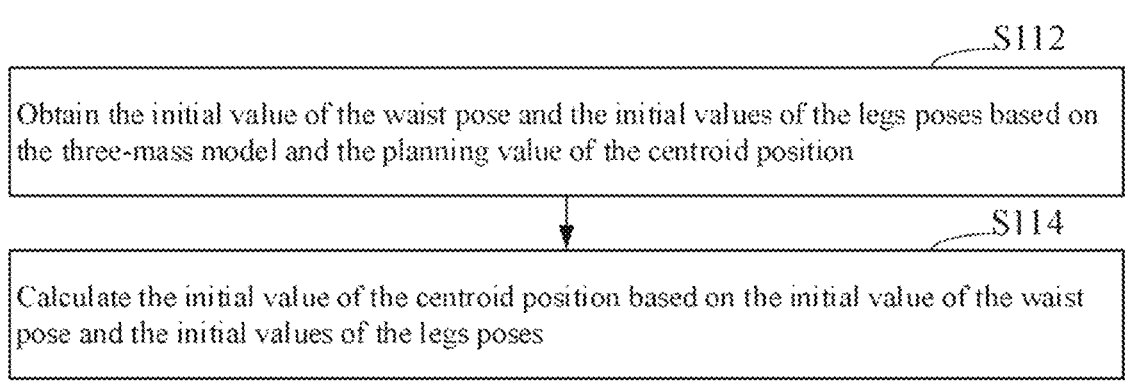
FIG. 5 is a flow chart of obtaining an initial value of a waist pose, initial values of legs poses, and an initial value of a centroid position according to an embodiment of the present disclosure.

FIG. 5 is a flow chart of obtaining an initial value of a waist pose, initial values of legs poses, and an initial value of a centroid position according to an embodiment of the present disclosure. The robot centroid position adjustment method is based on the robot centroid position adjustment method of the embodiment of FIG. 1. As shown in FIG. 5, in this embodiment, step S110 of the robot centroid position adjustment method of the embodiment of FIG. 1 includes the following steps.

S112: obtaining the initial value of the waist pose and the initial values of the legs poses based on the three-mass model and the planning value of the centroid position.

In biped robot control technology, when calculating the actual centroid position at which the robot is walking, it usually uses a three-mass model to simplify the structure of the robot, that is, the robot is simplified into a model with only three rigid bodies of a waist, a left leg, and a right leg. Within the cycle of the current control system instruction, through the above-mentioned model, the time trajectory of the centroid position can be roughly converted into the time trajectory of the waist pose and the legs poses, and the corresponding planning value of the centroid position in the cycle of the current control system instruction can be further converted into the initial value of the waist pose and the initial values of the legs poses.

S114: calculating the initial value of the centroid position based on the initial value of the waist pose and the initial values of the legs poses.

In which, based on the initial value of the waist pose and the initial values of the legs poses that both adopt the world coordinate system, the initial value of the centroid position is calculated through the inverse kinematics algorithm.

Figure 6:
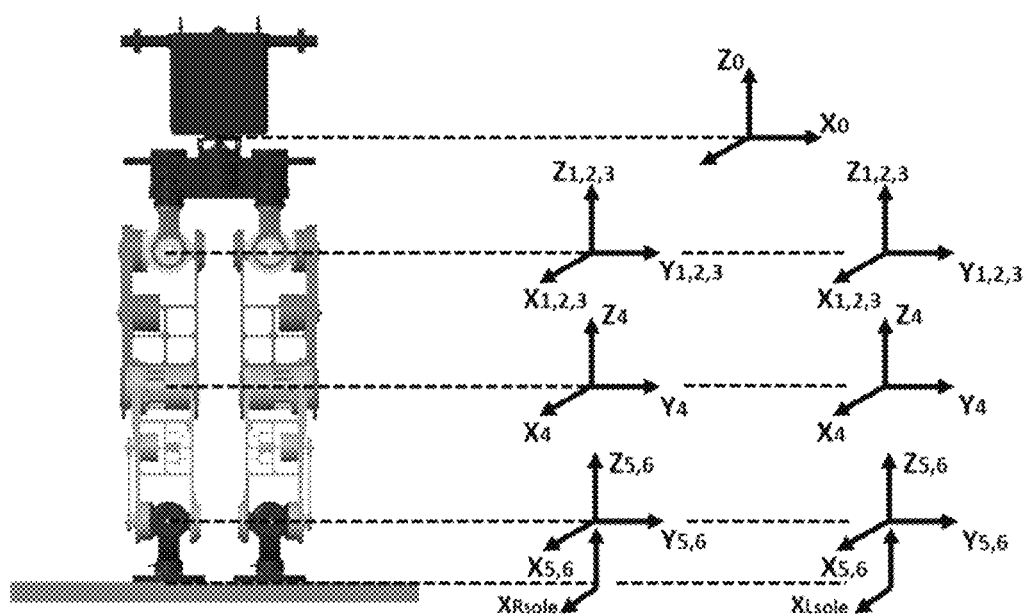
FIG. 6 is a schematic diagram of the structure and a coordinate system of a robot according to an embodiment of the present disclosure.

FIG. 6 is a schematic diagram of the structure and a coordinate system of a robot according to an embodiment of the present disclosure. As shown in FIG. 6, in this embodiment, the robot is a biped robot having two legs (i.e., a left leg and a right leg), which has six motors in each leg, and there are output shafts of three motors intersect with a center of a hip of the robot. For example, in the left leg, there are three motors disposed at the intersection of the left leg and the hip, one motor disposed at the knee, and two motors having output shafts intersecting with the ankle, hence the left leg has a total of six motors. For the convenience of description, it assumes that motor 1 is for the rotation of the thigh, motor 2 is for the sideward swing of the, motor 3 is for the forward swing of the thigh, motor 4 is for the forward swing of the calf, motor 5 is for the forward swing of the ankle, motor 6 is for the sideward swing of the ankle.

In FIG. 6, all coordinate systems have the upward Z-axis, the frontward X-axis, and the leftward Y-axis. For ease of understanding, the left and right legs have the same mark as a whole, where (X0, Y0, Z0) is the waist coordinate system (in the figure, only Z0 is marked for intuitive showing), (X1, Y1, Z1) represents the hip rotation coordinate system, (X2, Y2, Z2) represents the hip sideward swing coordinate system, (X3, Y3, Z3) represents the hip forward swing coordinate system, (X4, Y4, Z4) represents the calf forward swing coordinate system, (X5, Y5, Z5) represents the ankle forward swing coordinate system, (X6, Y6, Z6) represents the ankle outward swing coordinate system, "sole" is the sole coordinate system (referred to as the legs coordinate system), and Z1, X2, Y3, Y4, Y5 and X6 are respectively parallel to the respective rotational axes of motors 1-6. Rsole and Lsole represent the left leg coordinate system and the right leg coordinate system, respectively, and have the same zero orientation as the other coordinate systems described above.

In the above-mentioned process of calculating the initial value of the centroid position based on the initial value of the waist pose and the initial values of the legs poses using the inverse kinematics algorithm, there are two major steps including executing the waist pose inverse kinematics algorithm and the centroid position inverse kinematics algorithm. In which, the key point is to find the vector from the ankle to the hip joint first and then to express in the ankle coordinate system.

In one embodiment, taking the right leg hanging as an example, six initial joint angles $\theta_1$, $\theta_2$, $\theta_3$, $\theta_4$, $\theta_5$ and $\theta_6$ of the right leg are calculated using the waist pose inverse kinematics algorithm, and the pose of the right leg with respect to the waist which is expressed as ${}^wT_f$ herein can be calculated based on the initial value of the right leg pose and the initial value of the waist pose. The six initial joint angles $\theta_1$, $\theta_2$, $\theta_3$, $\theta_4$, $\theta_5$ and $\theta_6$ of the right leg are calculated, which respectively represent the initial thigh rotational angle, the initial thigh sideward swing angle, the initial thigh forward swing angle, the initial calf forward swing angle, the initial ankle forward swing angle, and the initial ankle sideward swing angle.

Figure 7:
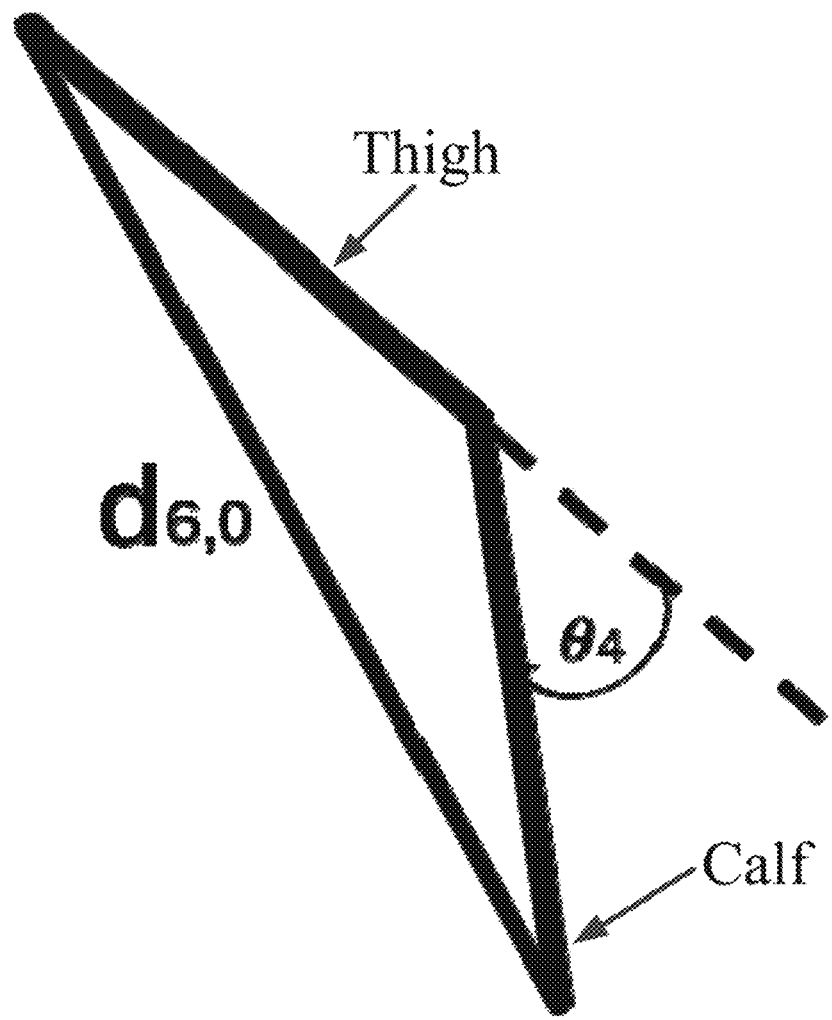
FIG. 7 is a schematic diagram of an initial calf forward swing angle according to an embodiment of the present disclosure.

The initial pose of the right leg in the waist coordinate system is represented as ${}^wT_f$, where ${}^wT_f$ represents a homogeneous transformation matrix of the initial value of the right leg pose in the right ankle outward swing coordinate system (X6, Y6, Z6); by using the chain rule of the homogeneous transformation matrix, it can obtain:

$$^wT_f = {}^wT_0 \cdot {}^0T_6 \cdot {}^6T_f = \begin{bmatrix} {}^wR_f & {}^wd_f \\ 0 & 1 \end{bmatrix};$$

$$^wT_0 = \begin{bmatrix} 1 & 0 & 0 & 0 \\ 0 & 1 & 0 & -L_1 \\ 0 & 0 & 1 & -L_2 \\ 0 & 0 & 0 & 1 \end{bmatrix}; \text{ and}$$

$$^6T_f = \begin{bmatrix} 1 & 0 & 0 & 0 \\ 0 & 1 & 0 & 0 \\ 0 & 0 & 1 & -L_5 \\ 0 & 0 & 0 & 1 \end{bmatrix};$$

the vector from the ankle to the hip joint in the ankle coordinate system is represented as:

$$^6d_{6,0} = -{}^wd_f + {}^wR_f^T \begin{bmatrix} 0 \\ -L_1 \\ -L_2 \end{bmatrix} + \begin{bmatrix} 0 \\ 0 \\ -L_5 \end{bmatrix} = \begin{bmatrix} r_x \\ r_y \\ r_z \end{bmatrix};$$

then, the cosine theorem is used to calculate $\theta_4$; FIG. 7 is a schematic diagram of an initial calf forward swing angle according to an embodiment of the present disclosure, as shown in FIG. 7, $\theta_4$ is the initial calf forward swing angle (i.e., the knee bending angle), and since the knee can only bend backwards, its range is $[-\pi,0]$:

$$r = \text{norm}(d_{6,0}); \text{ and } \theta_4 = a\cos\frac{L_3^2 + L_4^2 + r^2}{2L_3L_4} - \pi;$$

by projecting the hip joint onto the y-z plane of the ankle coordinate system, the sideward swing angle $\theta_6$ of the ankle can be calculated:

$$\theta_6 = a\tan 2(-r_y, r_z);$$

by projecting the hip joint onto the x-z plane of the ankle coordinate system using the information of $\theta_4$ and $\theta_6$, the forward swing angle $\theta_5$ of the ankle can be calculated:

$$\beta = \mathrm{asin}\left[\frac{L_3 - \sin(\pi - \theta_4)}{r}\right];$$

$$\gamma = -\mathrm{atan2}\left(r_x,\ \mathrm{sign}(r_z)\cdot\sqrt{r_y^2 + r_z^2}\right);\ \text{and}$$

$$\theta_5 = -\gamma - \beta;$$

the three rotational axes at the hip joint are orthogonal to each other, which respectively correspond to $\theta_1$, $\theta_2$ and $\theta_3$, and the poses generated by the three can be obtained by inversely deriving using $\theta_4$, $\theta_5$, $\theta_6$ and ${}^wR_f$:

$${}^0R_3 \cdot {}^3R_4 \cdot {}^4R_5 \cdot {}^5R_6 = {}^wR_f;$$

$${}^0R_3 = {}^wR_f ({}^3R_4 \cdot {}^4R_5 \cdot {}^5R_6)^T;$$

$$\theta_1 = a\tan 2({}^0R_3(2,1), {}^0R_3(2,2));\ \text{and}$$

$$\theta_2 = a\tan 2(-{}^0R_3(2,3), {}^0R_3(2,1)\cdot\sin\theta_1 + {}^0R_3(2,2)\cdot\cos\theta_1);$$

furthermore, the centroid position algorithm is used to calculate the initial value of the centroid position; based on the six initial joint angles $\theta_1$, $\theta_2$, $\theta_3$, $\theta_4$, $\theta_5$ and $\theta_6$ of the above-mentioned right leg, and combining the initial value of the waist pose, the initial value of the centroid position can be obtained through the forward kinematic centroid position algorithm, where the specific process is as follows:

$$\begin{cases} r_{com} = \dfrac{\sum m_i \cdot r_i}{\sum m_i} \\ r_i = r_{Oi} + com_i \\ com_i = R_i \cdot {}^i com_i \end{cases};$$

the initial value $r_{com}$ of the centroid position is equal to the weighted average for the initial value $r_i$ of the centroid position of each rigid body with respect to the mass $m_i$ of each rigid body, where the initial value $r_i$ of the centroid position of each rigid body can be obtained through the forward kinematics algorithm.

In which, the position of the origin of the coordinate system of each rigid body is represented as $r_{Oi}$ in the world coordinate system, where $r_{Oi}$ can be obtained by the continuous multiplication of the chain rule of the homogeneous transformation matrix, and the homogeneous transformation matrix of each rigid body can be obtained by calculating through the six initial joint angles $\theta_1$, $\theta_2$, $\theta_3$, $\theta_4$, $\theta_5$ and $\theta_6$ of the right leg and the initial value of the waist pose, com, is the vector of the initial value of the centroid position of each rigid body to the origin of the rigid body's own coordinate system, where the pose of each rigid body in the world coordinate system is represented by a rotation matrix $R_i$, ${}^i com_i$ represents a vector of the initial value of the centroid position of each rigid body in its own rigid body coordinate system (which is usually a fixed value obtained through a software such as Solidworks in mechanical design).

Figure 8:
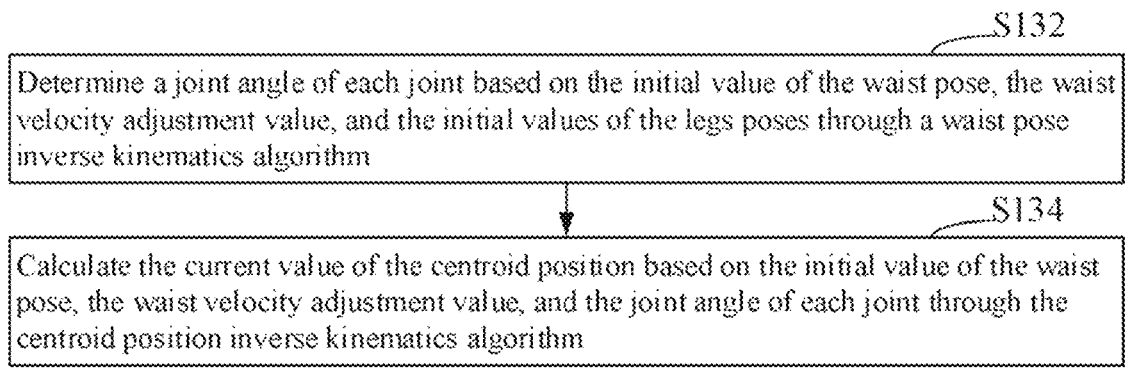
FIG. 8 is a flow chart of calculating a current value of the centroid position according to an embodiment of the present disclosure.

FIG. 8 is a flow chart of calculating a current value of the centroid position according to an embodiment of the present disclosure. The robot centroid position adjustment method is based on the robot centroid position adjustment method of the embodiment of FIG. 1. As shown in FIG. 8, in this embodiment, step S130 of the robot centroid position adjustment method of the embodiment of FIG. 1 includes the following steps.

S132: determining a joint angle of each joint based on the initial value of the waist pose, the waist velocity adjustment value, and the initial values of the legs poses through a waist pose inverse kinematics algorithm.

Based on the initial value of the waist pose and the waist velocity adjustment value, the current value of the waist pose can be calculated. Furthermore, the joint angle of each joint is obtained by calculating based on the current value of the waist pose and the initial values of the legs poses using the waist pose inverse kinematics algorithm, where the calculation method is basically the same as the calculation method for calculating the initial joint angle of each joint in step S110.

S134: calculating the current value of the centroid position based on the initial value of the waist pose, the waist velocity adjustment value, and the joint angle of each joint through the centroid position inverse kinematics algorithm.

In this step, based on the initial value of the waist pose and the waist velocity adjustment value, the current value of the waist pose can be calculated. Furthermore, the centroid position inverse kinematics algorithm is used to calculate the current value of the centroid position, where the calculation process is basically the same as the process of calculating the initial value of the centroid position in the above-mentioned step S110.

Figure 9:
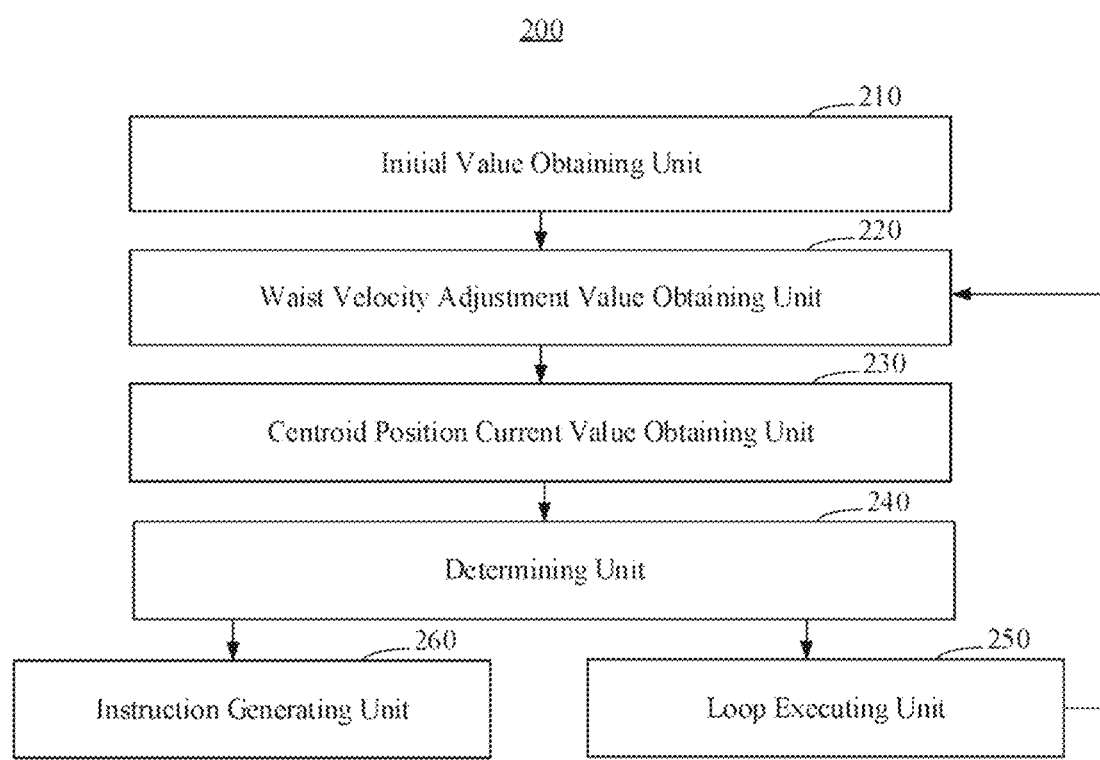
FIG. 9 is a schematic block diagram of an embodiment of a robot centroid position adjustment apparatus according to the present disclosure.

FIG. 9 is a schematic block diagram of an embodiment of a robot centroid position adjustment apparatus according to the present disclosure. In this embodiment, a robot centroid position adjustment apparatus 200 is provided. The robot centroid position adjustment apparatus 200 can be applied to a robot. As shown in FIG. 9, the apparatus includes:

an initial value obtaining unit 210 configured to obtain an initial value of a waist pose of the robot, initial values of legs poses of the robot, and an initial value of a centroid position of the robot based on a three-mass model of the robot and a planning value of the centroid position;

a waist velocity adjustment value obtaining unit 220 configured to obtain a waist velocity adjustment value based on the initial value of the centroid position and the planning value of the centroid position through a linear positive correlation corresponding to a change in the waist pose and a change in the centroid position;

a centroid position current value obtaining unit 230 configured to calculate a current value of the centroid position based on the initial value of the waist pose, the waist velocity adjustment value, and the initial values of the legs poses; and a determining unit 240 configured to determine whether a current value of the centroid position is equal to the planning value of the centroid position;

a loop executing unit 250 configured to obtain the current value of the centroid position to take as the initial value of the centroid position and invoke the waist velocity adjustment value obtaining unit until the current value of the centroid position is equal to the planning value of the centroid position, in response to the current value of the centroid position being not equal to the planning value of the centroid position; and an instruction generating unit 260 configured to generate a target control system instruction based on the current value of the centroid position, in response to the current value of the centroid position being equal to the planning value of the centroid position.

Figure 10:
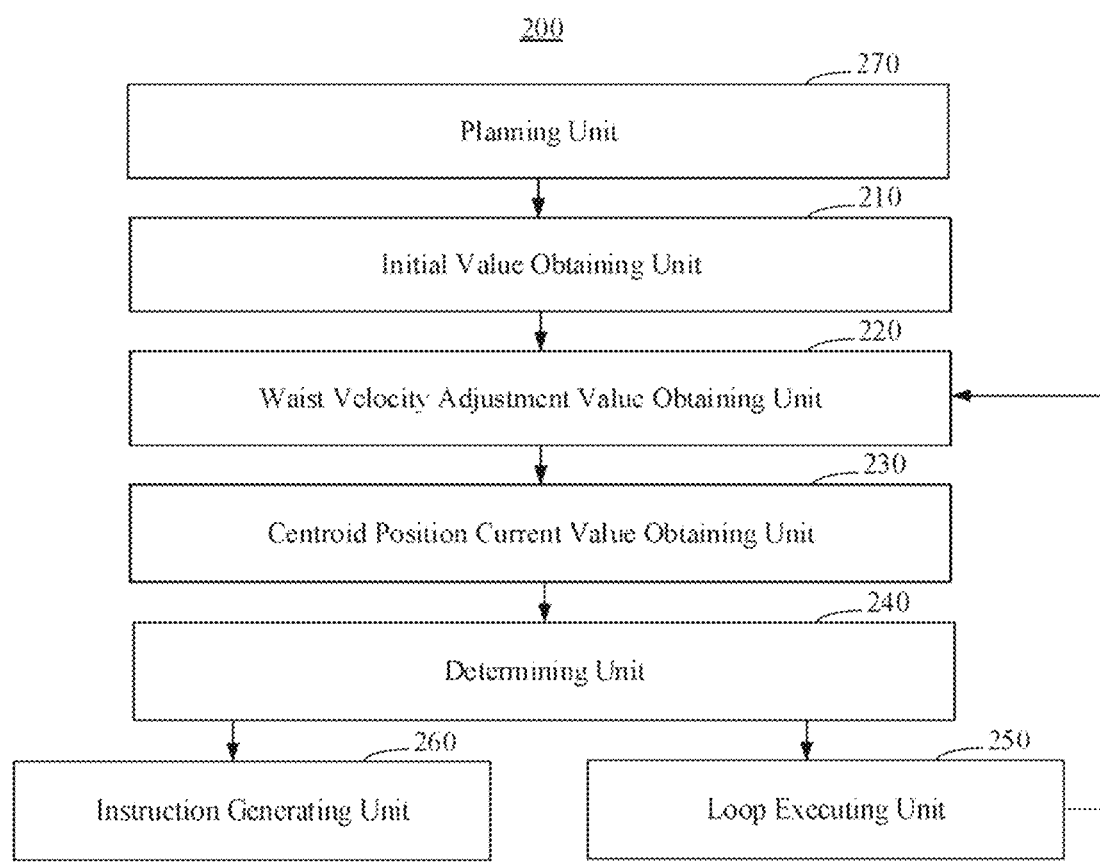
FIG. 10 is a schematic block diagram of another embodiment of a robot centroid position adjustment apparatus according to the present disclosure.

FIG. 10 is a schematic block diagram of another embodiment of a robot centroid position adjustment apparatus according to the present disclosure. In this embodiment, a robot centroid position adjustment apparatus based on the robot centroid position adjustment apparatus of FIG. 9 is provided. As shown in FIG. 10, the apparatus includes:

a planning unit 270 configured to generate the planning value of the centroid position based on a linear inverted pendulum model and one or more preset parameters of the robot.

Figure 11:
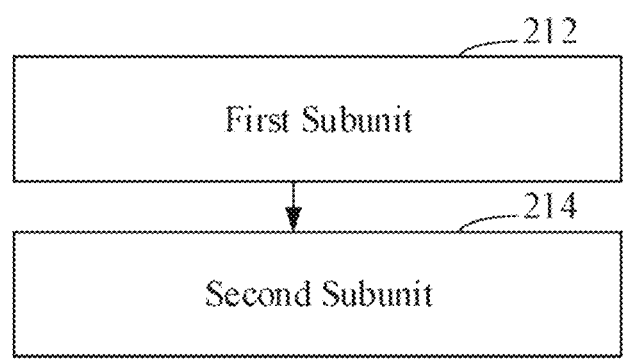
FIG. 11 is a schematic block diagram of an initial value obtaining unit according to an embodiment of the present disclosure.

FIG. 11 is a schematic block diagram of an initial value obtaining unit according to an embodiment of the present disclosure. As shown in FIG. 11, the initial value obtaining unit 210 of the apparatus of FIG. 9 includes:

a first subunit 212 configured to obtain the initial value of the waist pose and the initial values of the legs poses based on the three-mass model of the robot and the planning value of the centroid position; and a second subunit 214 configured to calculate the initial value of the centroid position based on the initial value of the waist pose and the initial values of the legs poses.

Figure 12:
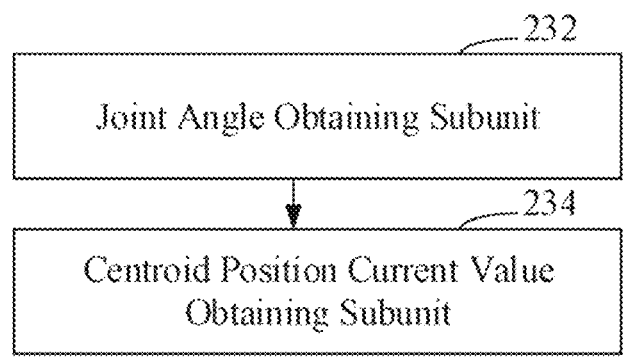
FIG. 12 is a schematic block diagram of a centroid position current value obtaining unit according to an embodiment of the present disclosure.

FIG. 12 is a schematic block diagram of a centroid position current value obtaining unit according to an embodiment of the present disclosure. As shown in FIG. 12, the centroid position current value obtaining unit 230 of the apparatus of FIG. 9 includes:

a joint angle obtaining subunit 232 configured to determine a joint angle of each joint based on the initial value of the waist pose, the waist velocity adjustment value, and the initial values of the legs poses through a waist pose inverse kinematics algorithm; and a centroid position current value obtaining subunit 234 configured to calculate the current value of the centroid position based on the initial value of the waist pose, the waist velocity adjustment value, and the joint angle of each joint.

In this embodiment, each of the above-mentioned modules/units is implemented in the form of software, which can be computer program(s) stored in a memory of the robot centroid position adjustment apparatus 200 and executable on a processor of the robot centroid position adjustment apparatus 200. In other embodiments, each of the above-mentioned modules/units may be implemented in the form of hardware (e.g., a circuit of the robot centroid position adjustment apparatus 200 which is coupled to the processor of the robot centroid position adjustment apparatus 200) or a combination of hardware and software (e.g., a circuit with a single chip microcomputer).

Furthermore, in one embodiment, a robot is provided. The robot includes a processor, a storage, and a computer program stored in the storage and executable on the processor. When executing (instructions in) the computer program, the processor implements the steps in the above-mentioned method embodiment one, for example, steps S110-S160 shown in FIG. 1. Alternatively, when the processor executes the (instructions in) computer program 42, the functions of each module/unit in the above-mentioned device embodiments, for example, the functions of the modules 210-260 shown in FIG. 1 are implemented.

Still furthermore, in one embodiment, a data storage medium storing the computer program of the above-mentioned robot is provided.

The forgoing are only embodiments of the present disclosure, and the scope of the present disclosure is not limited thereto. Any person skilled in the art can easily think of changes or substitutions within the technical scope of the present disclosure, and the changes or substitutions should be covered by the scope of the present disclosure.

What is claimed is:

1. A computer-implemented centroid position adjustment method, comprising:

providing a robot comprising a processor and a plurality of joints;

S1: obtaining, by the processor, an initial value of a waist pose of the robot, initial values of legs poses of the robot, and an initial value of a centroid position of the robot based on a three-mass model of the robot and a planning value of the centroid position, wherein the initial values of legs poses of the robot are initial values corresponding to the robot in a cycle of a current control system instruction, and the initial values of legs poses of the robot remain unchanged within the cycle of the current control system instruction;

S2: obtaining, by the processor, a waist velocity adjustment value based on the initial value of the centroid position and the planning value of the centroid position through a linear positive correlation corresponding to a change in the waist pose and a change in the centroid position;

S3: calculating, by the processor, a current value of the centroid position based on the initial value of the waist pose, the waist velocity adjustment value, and the initial values of the legs poses; and S4: determining, by the processor, whether a current value of the centroid position is equal to the planning value of the centroid position; obtaining the current value of the centroid position to take as the initial value of the centroid position and returning to step S2 until the current value of the centroid position is equal to the planning value of the centroid position in response to the current value of the centroid position being not equal to the planning value of the centroid position; generating, by the processor, a target control system instruction based on the current value of the centroid position in response to the current value of the centroid position being equal to the planning value of the centroid position, obtaining corresponding control parameters based on the target control system instruction, and adjusting an angle of each of the joints according to the corresponding control parameters.

2. The method of claim 1, wherein before step S1 further comprises:

generating, by the processor, the planning value of the centroid position based on a linear inverted pendulum model and one or more preset parameters of the robot.

3. The method of claim 1, wherein step S1 comprises:

obtaining, by the processor, the initial value of the waist pose and the initial values of the legs poses based on the three-mass model of the robot and the planning value of the centroid position; and calculating, by the processor, the initial value of the centroid position based on the initial value of the waist pose and the initial values of the leas poses.

4. The method of claim 1, wherein step S3 comprises:

determining, by the processor, a joint angle of each joint based on the initial value of the waist pose, the waist velocity adjustment value, and the initial values of the legs poses through a waist pose inverse kinematics algorithm; and calculating, by the processor, the current value of the centroid position based on the initial value of the waist pose, the waist velocity adjustment value, and the joint angle of each joint through a centroid position inverse kinematics algorithm.

5. A centroid position adjustment apparatus for a robot, comprising:
- an initial value obtaining unit configured to obtain an initial value of a waist pose of the robot, initial values of legs poses of the robot, and an initial value of a centroid position of the robot based on a three-mass model of the robot and a planning value of the centroid position, wherein the initial values of legs poses of the robot are initial values corresponding to the robot in a cycle of a current control system instruction, and the initial values of leas poses of the robot remain unchanged within the cycle of the current control system instruction;
- a waist velocity adjustment value obtaining unit configured to obtain a waist velocity adjustment value based on the initial value of the centroid position and the planning value of the centroid position through a linear positive correlation corresponding to a change in the waist pose and a change in the centroid position;
- a centroid position current value obtaining unit configured to calculate a current value of the centroid position based on the initial value of the waist pose, the waist velocity adjustment value, and the initial values of the legs poses; and
- a determining unit configured to determine whether a current value of the centroid position is equal to the planning value of the centroid position;
- a loop executing unit configured to obtain the current value of the centroid position to take as the initial value of the centroid position and invoke the waist velocity adjustment value obtaining unit until the current value of the centroid position is equal to the planning value of the centroid position, in response to the current value of the centroid position being not equal to the planning value of the centroid position; and
- an instruction generating unit configured to generate a target control system instruction based on the current value of the centroid position, obtain corresponding control parameters based on the target control system instruction, and adjust an angle of each of joints of the robot according to the corresponding control parameters, in response to the current value of the centroid position being equal to the planning value of the centroid position.

6. The apparatus of claim 5, further comprising:
- a planning unit configured to generate the planning value of the centroid position based on a linear inverted pendulum model and one or more preset parameters of the robot.

7. The apparatus of claim 5, wherein the initial value obtaining unit comprises:
- a first subunit configured to obtain the initial value of the waist pose and the initial values of the legs poses based on the three-mass model of the robot and the planning value of the centroid position; and
- a second subunit configured to calculate the initial value of the centroid position based on the initial value of the waist pose and the initial values of the legs poses.

8. The apparatus of claim 5, wherein the centroid position current value obtaining unit comprises:
- a joint angle obtaining subunit configured to determine a joint angle of each joint based on the initial value of the waist pose, the waist velocity adjustment value, and the initial values of the legs poses through a waist pose inverse kinematics algorithm; and
- a centroid position current value obtaining subunit configured to calculate the current value of the centroid position based on the initial value of the waist pose, the waist velocity adjustment value, and the joint angle of each joint.

9. A robot, comprising:
- a memory;
- a plurality of joints;
- a processor; and
- one or more computer programs stored in the memory and executable on the processor, wherein the one or more computer programs comprise:
- instructions for obtaining an initial value of a waist pose of the robot, initial values of legs poses of the robot, and an initial value of a centroid position of the robot based on a three-mass model of the robot and a planning value of the centroid position, wherein the initial values of legs poses of the robot are initial values corresponding to the robot in a cycle of a current control system instruction, and the initial values of legs poses of the robot remain unchanged within the cycle of the current control system instruction;
- instructions for obtaining a waist velocity adjustment value based oil the initial value of the centroid position and the planning value of the centroid position through a linear positive correlation corresponding to a change in the waist pose and a change in the centroid position;
- instructions for calculating a current value of the centroid position based on the initial value of the waist pose, the waist velocity adjustment value, and the initial values of the legs poses; and
- instructions for determining whether a current value of the centroid position is equal to the planning value of the centroid position; obtaining the current value of the centroid position to take as the initial value of the centroid position and executing the instructions for obtaining the waist velocity adjustment value until the current value of the centroid position is equal to the planning value of the centroid position in response to the current value of the centroid position being not equal to the planning value of the centroid position; generating a target control system instruction based on the current value of the centroid position in response to the current value of the centroid position being equal to the planning value of the centroid position, obtaining corresponding control parameters based on the target control system instruction, and adjusting an angle of each of the joints according to the corresponding control parameters.

10. The robot of claim 9, wherein the one or more computer programs further comprise:
- instructions for generating the planning value of the centroid position based on a linear inverted pendulum model and one or more preset parameters of the robot.

11. The robot of claim 9, wherein the instructions for obtaining the initial value of the waist pose, the initial values of the legs poses, and the initial value of the centroid position comprise:
- instructions for obtaining the initial value of the waist pose and the initial values of the legs poses based on the three-mass model of the robot and the planning value of the centroid position; and
- instructions for calculating the initial value of the centroid position based on the initial value of the waist pose and the initial values of the leas poses.

12. The robot of claim 1, Wherein the instructions for calculating the current value of the centroid position comprise:

instructions for determining a joint angle of each joint based on the initial value of the waist pose, the waist velocity adjustment value, and the initial values of the legs poses through a waist pose inverse kinematics algorithm; and instructions for calculating the current value of the centroid position based on the initial value of the waist pose, the waist velocity adjustment value, and the joint angle of each joint through a centroid position inverse kinematics algorithm.

13. The method of claim 1, wherein the waist velocity adjustment valve is obtained by the following formula:

$$V_{waist}=Kp(COM_{desired}-COM_{actual});$$

where $V_{waist}$ is the waist velocity adjustment value, $COM_{desired}$ is the planning value of the centroid position, $COM_{actual}$ is the initial value of the centroid position, $(COM_{desired}-COM_{actual})$ is a change amount of the centroid position, and Kp is a linear adjustment coefficient.

14. The method of claim 13, wherein an upper limit of Kp is determined by a distribution of a mass of the robot, and when the centroid position is in middle of a waist and legs of the robot, the upper limit of Kp does not exceed 2.

15. The method of claim 2 wherein step of generating, by the processor, the planning value of the centroid position based on the linear inverted pendulum model and the one or more preset parameters of the robot comprises:

generating, by the processor, a time trajectory about the centroid position, based on the linear inverted pendulum model, a planning velocity and a planning step size of the robot; and obtaining, by the processor, the planning value of the centroid position corresponding to the cycle of the current control system instruction, according to the time trajectory about the centroid position.

16. The method of claim 3, wherein when one leg of the robot is hanged, step of calculating, by the processor, the initial value of the centroid position based on the initial value of the waist pose and the initial values of the leas poses comprises;

calculating, by the processor, an initial joint angle of each of joints of a hanged leg of the robot based on an initial value of a leg pose of the hanged leg and the initial value of the waist pose, through a waist pose inverse kinematics algorithm; and obtaining, by the processor, the initial value of the centroid position based on the initial joint angle of each of the joints of the hanged leg and the initial value of the waist pose, through a forward kinematic centroid position algorithm.

17. The method of claim 16, wherein the initial joint angle of each of the joints of the hanged leg comprises: an initial thigh rotational angle of the hanged leg, an initial thigh sideward swing angle of the hanged leg, an initial thigh forward swing angle of the hanged leg, an initial calf forward swing angle of the hanged leg, an initial ankle forward swing angle of the hanged leg, and an initial ankle sideward swing angle of the hanged leg; and step of calculating, by the processor, the initial joint angle of each of the joints of the hanged leg of the robot based on the initial value of the leg pose of the hanged leg and the initial value of the waist pose, through the waist pose inverse kinematics algorithm, comprises:

calculating, by the processor, an initial pose of the hanged leg in a waist coordinate system, based on the initial value of the leg pose of the hanged leg and the initial value of the waist pose, wherein the initial pose of the hanged leg in the waist coordinate system is represented by a homogeneous transformation matrix of the initial value of the leg pose of the hanged leg in an ankle outward swing coordinate system of the hanged leg;

obtaining a vector from an ankle of the hanged leg to a hip joint of the hanged leg in an ankle coordinate system, based on the initial pose of the hanged leg in the waist coordinate system;

calculating the initial calf forward swing angle, based on the vector from the ankle of the hanged leg to the hip joint of the hanged leg in the ankle coordinate system through a cosine theorem;

calculating the initial ankle sideward swing angle, by projecting the hip joint of the hanged leg onto a y-z plane of the ankle coordinate system;

calculating the initial ankle forward swing angle, by projecting the hip joint of the hanged leg onto a x-z plane of the ankle coordinate system using information of the initial calf forward swing angle and the initial ankle sideward swing angle; and obtaining the initial thigh rotational angle, the initial thigh sideward swing angle, and the initial thigh forward swing angle, based on the initial calf forward swing angle, the initial ankle forward swing angle, and the initial ankle sideward swing angle.

18. The method of claim 16, wherein step of obtaining, by the processor, the initial value of the centroid position based on the initial joint angle of each of the joints of the hanged leg and the initial value of the waist pose, through a forward kinematic centroid position algorithm comprises:

obtaining, by the processor, the initial value of the centroid position by the following formulas:

$$\begin{cases} r_{com} = \dfrac{\sum m_i \cdot r_i}{\sum m_i} \\ r_i = r_{Oi} + com_i \\ com_i = R_i \cdot {}^i com_i \end{cases} ;$$

where, $r_{com}$ is the initial value of the centroid position of the robot, $r_i$ is an initial value of a centroid position of each rigid body of the robot, $m_i$ is a mass of each rigid body of the robot, $r_{Oi}$ is a position of an origin of a coordinate system of each rigid body in a world coordinate system, $com_i$ is a vector of the initial value of the centroid position of each rigid body to an origin of a rigid body's own coordinate system, $R_i$ is a rotation matrix representing a pose of each rigid body in the world coordinate system, and ${}^i com_i$ represents a vector of the initial value of the centroid position of each rigid body in its own rigid body coordinate system; and wherein $r_i$ is obtained through the forward kinematic centroid position algorithm, $r_{Oi}$ is obtained by a continuous multiplication of a chain rule of a homogeneous transformation matrix, and a homogeneous transformation matrix of each rigid body is obtained based on the initial joint angle of each of the joints of the hanged leg, and the initial value of the waist pose.

19. The method of claim 16, wherein the robot is a biped robot having a left leg and a right leg, both the left leg and the right leg have six motors, and output shafts of three motors in the six motors intersect with a center of a hip of the robot.

20. The method of claim 19, wherein in the left leg, three motors disposed at an intersection of the left leg and the hip, one motor disposed at a knee of the left leg, and two motors having output shafts intersecting with an ankle of the left leg; and in the right leg, three motors disposed at an intersection of the right leg and the hip, one motor disposed at a knee of the right leg, and two motors having output shafts intersecting with an ankle of the right leg.

\* \* \* \* \*